(12) United States Patent
Cook et al.

(10) Patent No.: US 11,429,656 B2
(45) Date of Patent: *Aug. 30, 2022

(54) SCALED DELIVERY OF MEDIA CONTENT

(71) Applicant: Snap Inc., Santa Monica, CA (US)

(72) Inventors: Matthew Lee Cook, San Francisco, CA (US); Wisam Dakka, San Francisco, CA (US); Wesley Evans, Gainesville, FL (US); Andre Madeira, Saratoga, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,624

(22) Filed: Jul. 6, 2020

(65) Prior Publication Data
US 2020/0334283 A1 Oct. 22, 2020

Related U.S. Application Data

(63) Continuation of application No. 15/891,082, filed on Feb. 7, 2018, now Pat. No. 10,733,225.
(Continued)

(51) Int. Cl.
*G06F 15/16* (2006.01)
*G06F 16/40* (2019.01)
(Continued)

(52) U.S. Cl.
CPC ............. *G06F 16/40* (2019.01); *G06N 20/00* (2019.01); *H04L 67/1076* (2013.01)

(58) Field of Classification Search
CPC ........ G06F 16/40; G06F 16/41; G06F 16/433; G06F 16/438; G06F 16/4387; G06F 16/4393; G06N 20/00; H04L 67/1076
(Continued)

(56) References Cited

U.S. PATENT DOCUMENTS 7,552,862 B2   6/2009   Flake et al.
7,917,553 B2 *  3/2011   Nichols .................. G06F 16/48
                                                707/999.102

(Continued)

OTHER PUBLICATIONS

"U.S. Appl. No. 15/891,082, Non Final Office Action dated Oct. 7, 2019", 8 pgs.
(Continued)

*Primary Examiner* — Thu Ha T Nguyen
(74) *Attorney, Agent, or Firm* — Schwegman Lundberg & Woessner, P.A.

(57) ABSTRACT

Systems, devices, media, and methods are presented for scaled delivery of media content. The systems and methods assign a set of proposed designations to a plurality of media content. The systems and methods select a set of media content from the plurality of media content based on the set of proposed designations and distribute a subset of media content of the set of media content to a selected user of a plurality of users. The subset of media content is presented at a computing device associated with the selected user. The systems and methods receive a set of indicators for each media content of the subset of media content. Each indicator represents an interaction with a media content of the subset of media content. The systems and methods cause presentation of an interaction notification at the computing device associated with the selected user.

20 Claims, 13 Drawing Sheets

Related U.S. Application Data

(60) Provisional application No. 62/554,928, filed on Sep. 6, 2017.

(51) Int. Cl.
*H04L 67/1074* (2022.01)
*G06N 20/00* (2019.01)

(58) Field of Classification Search
USPC .................................. 709/217, 216, 218
See application file for complete search history.

(56) References Cited

U.S. PATENT DOCUMENTS

| | | |
|---|---|---|
| 7,996,566 B1 | 8/2011 | Sylvain et al. |
| 8,208,947 B2 | 6/2012 | Yasrebi et al. |
| 8,661,075 B2 | 2/2014 | Smith et al. |
| 8,931,008 B2 * | 1/2015 | McCoy ............ H04N 21/4622 725/46 |
| 8,943,134 B2 | 1/2015 | Reis et al. |
| 9,465,521 B1 * | 10/2016 | Giordano ............ G06F 3/0484 |
| 10,733,225 B1 | 8/2020 | Cook et al. |
| 10,977,296 B1 * | 4/2021 | Kizelshteyn ........ H04L 65/4076 |
| 2002/0091848 A1 * | 7/2002 | Agresta ............ H04N 21/42201 709/219 |
| 2003/0033380 A1 | 2/2003 | Kuriyama |
| 2004/0019497 A1 | 1/2004 | Volk et al. |
| 2005/0117880 A1 * | 6/2005 | Seo ...................... H04N 9/8715 386/248 |
| 2005/0283537 A1 | 12/2005 | Li et al. |
| 2006/0123455 A1 | 6/2006 | Pai et al. |
| 2006/0163358 A1 * | 7/2006 | Biderman ............ G06F 16/215 235/472.01 |
| 2006/0242267 A1 | 10/2006 | Grossman |
| 2006/0288112 A1 * | 12/2006 | Soelberg ................ H04L 63/08 709/231 |
| 2007/0136315 A1 | 6/2007 | Choi et al. |
| 2007/0250598 A1 | 10/2007 | Jain et al. |
| 2008/0016185 A1 * | 1/2008 | Herberger .......... H04L 65/4092 709/219 |
| 2008/0060014 A1 * | 3/2008 | Bentley ............. G06F 16/4387 725/52 |
| 2008/0155400 A1 | 6/2008 | Christensen |
| 2008/0301189 A1 * | 12/2008 | Petit ..................... G06Q 30/00 |
| 2009/0061764 A1 * | 3/2009 | Lockhart .............. G06F 16/40 705/14.1 |
| 2009/0106645 A1 * | 4/2009 | Knobel ................ G06F 16/435 715/236 |
| 2009/0178003 A1 | 7/2009 | Fiedler |
| 2009/0204639 A1 * | 8/2009 | Barrett ............... H04N 21/4425 |
| 2009/0254633 A1 | 10/2009 | Olive |
| 2009/0288131 A1 * | 11/2009 | Kandekar ............ G06F 16/4393 725/133 |
| 2010/0135637 A1 * | 6/2010 | McDermott ............. H04N 5/76 386/344 |
| 2010/0138517 A1 | 6/2010 | De et al. |
| 2010/0142915 A1 * | 6/2010 | McDermott ....... H04N 21/4722 386/343 |
| 2010/0229243 A1 | 9/2010 | Lin et al. |
| 2010/0235757 A1 | 9/2010 | Kembel et al. |
| 2011/0206198 A1 * | 8/2011 | Freedman ............... H04M 3/51 379/265.03 |
| 2011/0302275 A1 | 12/2011 | Prodan et al. |
| 2012/0131125 A1 * | 5/2012 | Seidel .................... G11B 27/36 709/212 |
| 2012/0278439 A1 | 11/2012 | Ahiska et al. |
| 2013/0046826 A1 * | 2/2013 | Stanton ................. G06Q 30/02 709/204 |
| 2013/0060858 A1 | 3/2013 | Freishtat et al. |
| 2013/0073568 A1 * | 3/2013 | Federov ............. G06F 16/9535 707/E17.069 |
| 2013/0073979 A1 * | 3/2013 | Shepherd ............... G06Q 50/01 715/744 |
| 2013/0178962 A1 * | 7/2013 | DiMaria ............... G06F 3/0482 700/94 |
| 2014/0006559 A1 * | 1/2014 | Drapeau ................. H04L 51/10 709/217 |
| 2014/0156645 A1 * | 6/2014 | Brust ...................... G06F 16/24 707/722 |
| 2015/0046958 A1 | 2/2015 | Fujita |
| 2015/0088607 A1 | 3/2015 | Georgoff et al. |
| 2015/0120724 A1 * | 4/2015 | Prager ..................... G06F 16/93 707/736 |
| 2015/0134431 A1 | 5/2015 | Georgoff et al. |
| 2015/0169535 A1 * | 6/2015 | Pusateri ................ G06F 40/186 715/202 |
| 2015/0188962 A1 | 7/2015 | Bulava et al. |
| 2015/0188963 A1 | 7/2015 | Bulava et al. |
| 2015/0228000 A1 | 8/2015 | Bijor et al. |
| 2015/0301692 A1 * | 10/2015 | Patsiokas ................. H04N 5/76 715/716 |
| 2015/0302456 A1 | 10/2015 | Rego et al. |
| 2015/0332225 A1 | 11/2015 | Schulz |
| 2015/0379554 A1 | 12/2015 | Copeland |
| 2016/0104076 A1 | 4/2016 | Maheshwari et al. |
| 2016/0174036 A1 | 6/2016 | Ruhstaller et al. |
| 2016/0269457 A1 * | 9/2016 | Tiraspolsky .......... H04L 65/605 |
| 2016/0373498 A1 * | 12/2016 | Mandyam ............. G11B 27/10 |
| 2017/0357655 A1 * | 12/2017 | Marchiori ............ G06F 3/04842 |
| 2019/0087438 A1 * | 3/2019 | Nelbach, Jr. ......... G06F 16/176 |
| 2019/0098360 A1 | 3/2019 | Keeney et al. |
| 2019/0132708 A1 | 5/2019 | Belghoul et al. |
| 2019/0306214 A1 * | 10/2019 | Drapeau ................. H04L 51/10 |
| 2020/0027470 A1 * | 1/2020 | Thurman ................ G10L 19/22 |
| 2020/0104533 A1 * | 4/2020 | Mick, Sr. ............... G06F 21/64 |

OTHER PUBLICATIONS

"U.S. Appl. No. 15/891,082, Notice of Allowance dated Mar. 27, 2020", 9 pgs.

"U.S. Appl. No. 15/891,082, Response filed Feb. 5, 2020 to Non Final Office Action dated Oct. 7, 2019".

* cited by examiner

SCALED DELIVERY OF MEDIA CONTENT

CLAIM OF PRIORITY

This application is a continuation of U.S. patent application Ser. No. 15/891,082, filed on Feb. 7, 2018, which claims the benefit of priority to U.S. Provisional Application Ser. No. 62/554,928, filed on Sep. 6, 2017, each of which is incorporated herein by reference in its entirety.

TECHNICAL FIELD

Embodiments of the present disclosure relate generally to enable scaled delivery of media content. More particularly, but not by way of limitation, the present disclosure addresses systems and methods for selecting media content and delivering media content among a distributed set of users.

BACKGROUND

Telecommunications applications and devices can provide communication between servers and multiple users using a variety of media, such as text, images, sound recordings, and/or video recording. For example, streaming systems allow for delivery of media content to individual users based on user selections choosing desired media for delivery. Social media services allow publication of media content by users or passing media content from one user to another or a group of users. Such social media services may employ machine learning operations to automatically identify aspects of the media content posted by a user. Streaming systems may be limited to distributing media content selected by users. Social media services may be limited to distributing media content based on user selections or social networks associated with a given user. Machine learning operations of social media services may incorrectly identify media content posted by users.

BRIEF DESCRIPTION OF THE DRAWINGS

Various ones of the appended drawings merely illustrate example embodiments of the present disclosure and should not be considered as limiting its scope.

Figure 1:
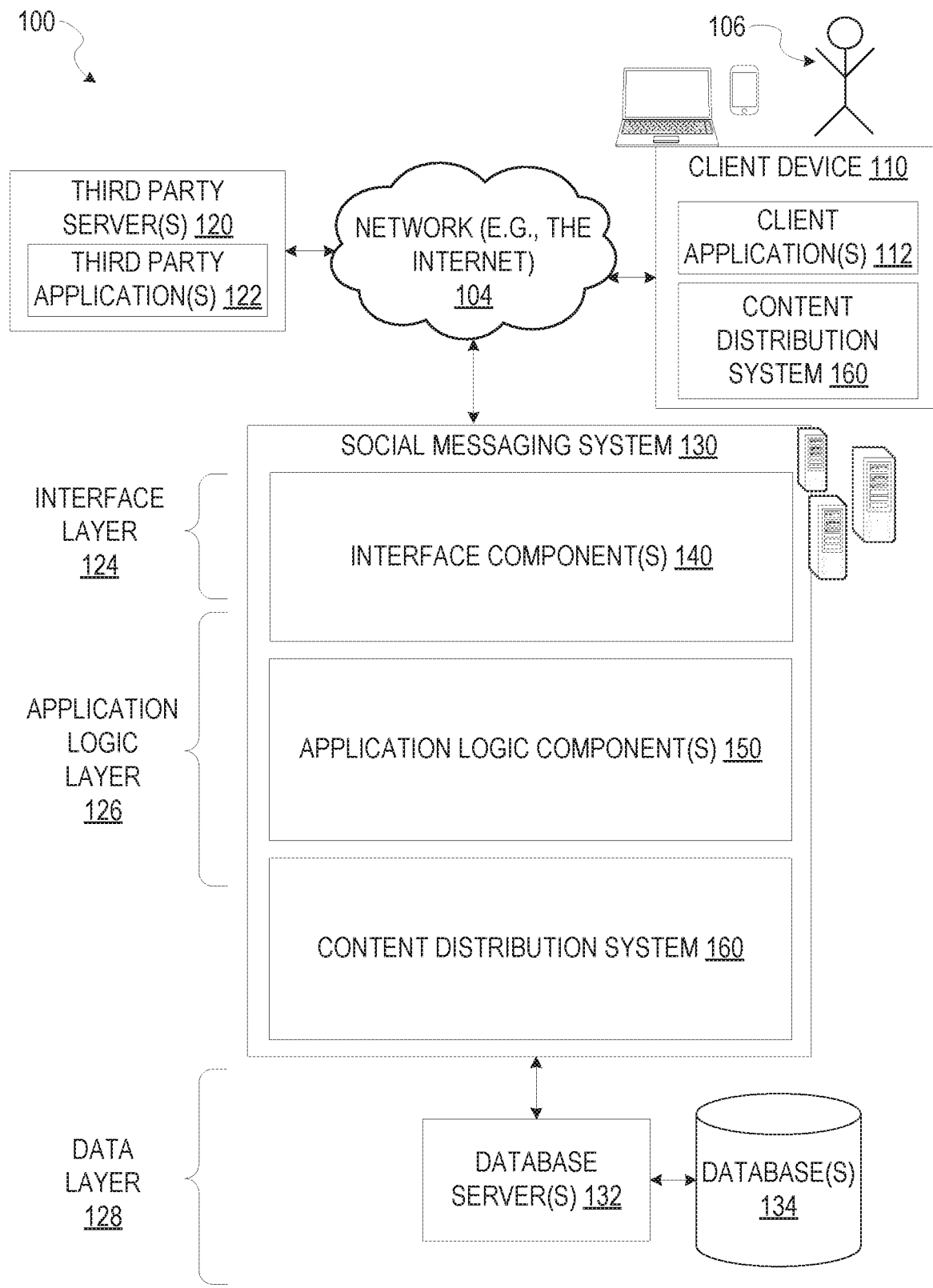
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one aspect of the present disclosure, systems and methods are disclosed which enable distributed creation of machine learning training databases, curation and moderation of search content, scaled distribution of media content, and other content delivery mechanisms. A user may enter an application, which presents a search screen on a touchscreen of a smartphone. The user is presented a button with an alert within the search bar. By tapping the button, the application presents a combination of task operations structured to present the user with images, video, or messages and labels for the content being presented. For example, a tap of the button presents a label task, a place ranking task, and a moderation task. The user taps one of the tasks and is presented with a structured interaction for the task. The user interacts with the images, video, or messages presented in the structured interaction to accept or reject the labels provided in the user interface. As each image, video, or message is classified, the user is presented with a subsequent piece of media. Once the user processes all of the images, videos, or messages for the task, a success message is presented. The success message dismisses the task from the application and the graphical user interface.

During the tasks, the user may generate machine learning training databases by labeling images, videos, or messages as pertaining to a specific topic, place, idea, or other suitable labels. The content distribution system of the present disclosure may compare results of machine learning analysis and modify machine learning operations to reflect labels of the machine learning training databases.

The above is one specific example. The various embodiments of the present disclosure relate to devices and instructions by one or more processors of a device to deliver or distribute media content in structured interfaces to enable creation of machine learning training databases, content labeling, and other suitable operations. A content distribution system is described that enables labeling, moderation, creation, and other distinguishing operations for sets of media content presented by the content distribution system.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third-party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of content distribution system 160 such that components of the content distribution system 160 configure the client device 110 to perform a specific set of functions with respect to operations of the content distribution system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the content distribution system 160 to enable scaled delivery of media content.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client device 110. In some embodiments, the user 106 interacts with the social messaging system 130 via the client device 110. The user 106 may not be part of the network system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the content distribution system 160 capable of scaled delivery of media content. Similarly, the client device 110 includes at least a portion of the content distribution system 160, as described above. In other examples, client device 110 may include the entirety of the content distribution system 160. In instances where the client device 110 includes a portion of (or all of) the content distribution system 160, the client device 110 can work alone or in cooperation with the social messaging system 130 to provide the functionality of the content distribution system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the content distribution system 160 may enable scaled delivery of media content. The device may distribute media content as a part of a generation of content for an ephemeral message.

Figure 2:
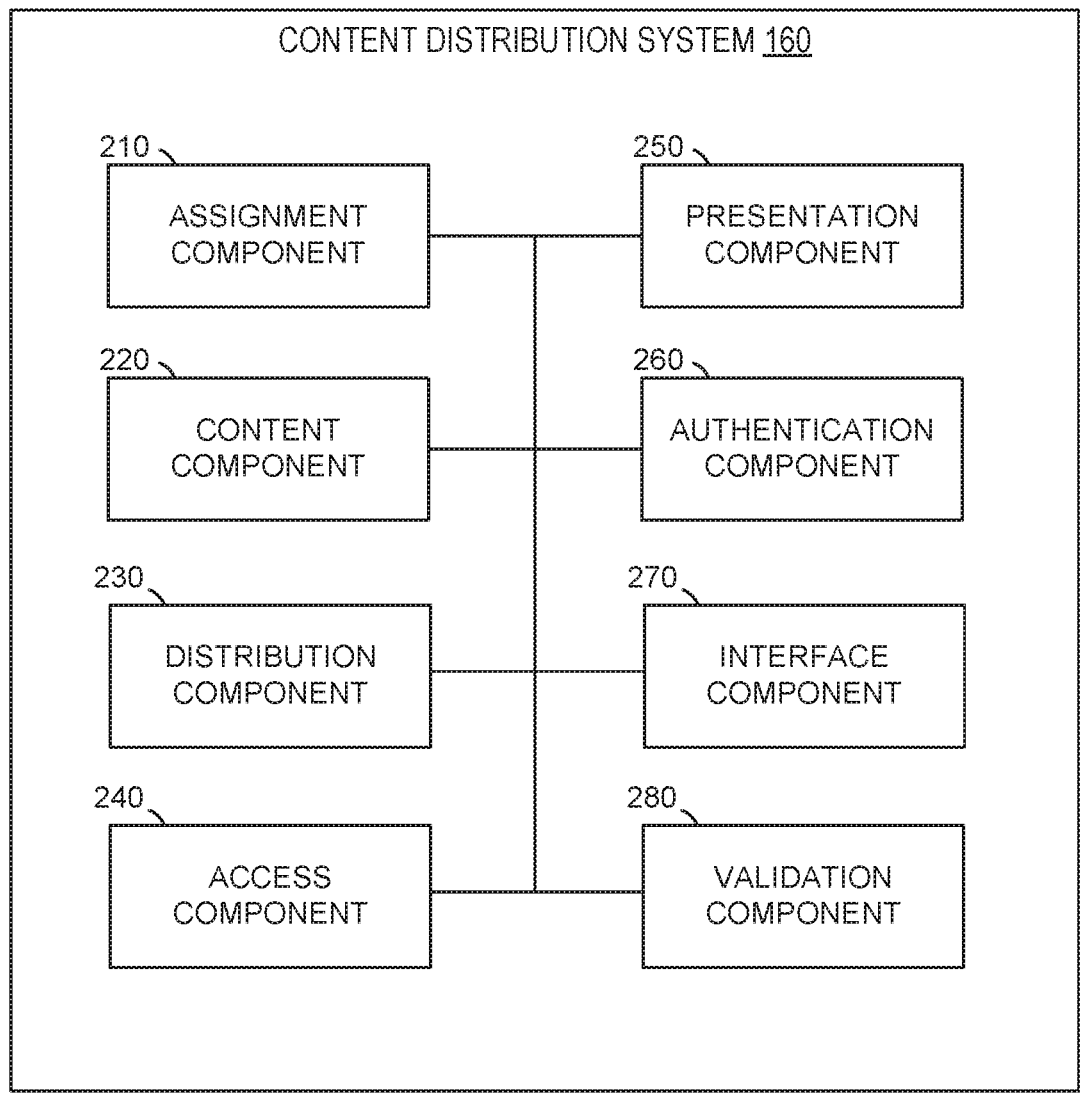
FIG. 2 is a diagram illustrating a content distribution system, according to some example embodiments.

In FIG. 2, in various embodiments, the content distribution system 160 can be implemented as a standalone system or implemented in conjunction with the client device 110, and is not necessarily included in the social messaging system 130. The content distribution system 160 is shown to include an assignment component 210, a content component 220, a distribution component 230, an access component 240, a presentation component 250, an authentication component 260, an interface component 270, and a validation component 280. All, or some, of the components 210-280, communicate with each other, for example, via a network coupling, shared memory, and the like. Each component of components 210-280 can be implemented as a single component, combined into other components, or further subdivided into multiple components. Other components not pertinent to example embodiments can also be included, but are not shown.

Figure 3:
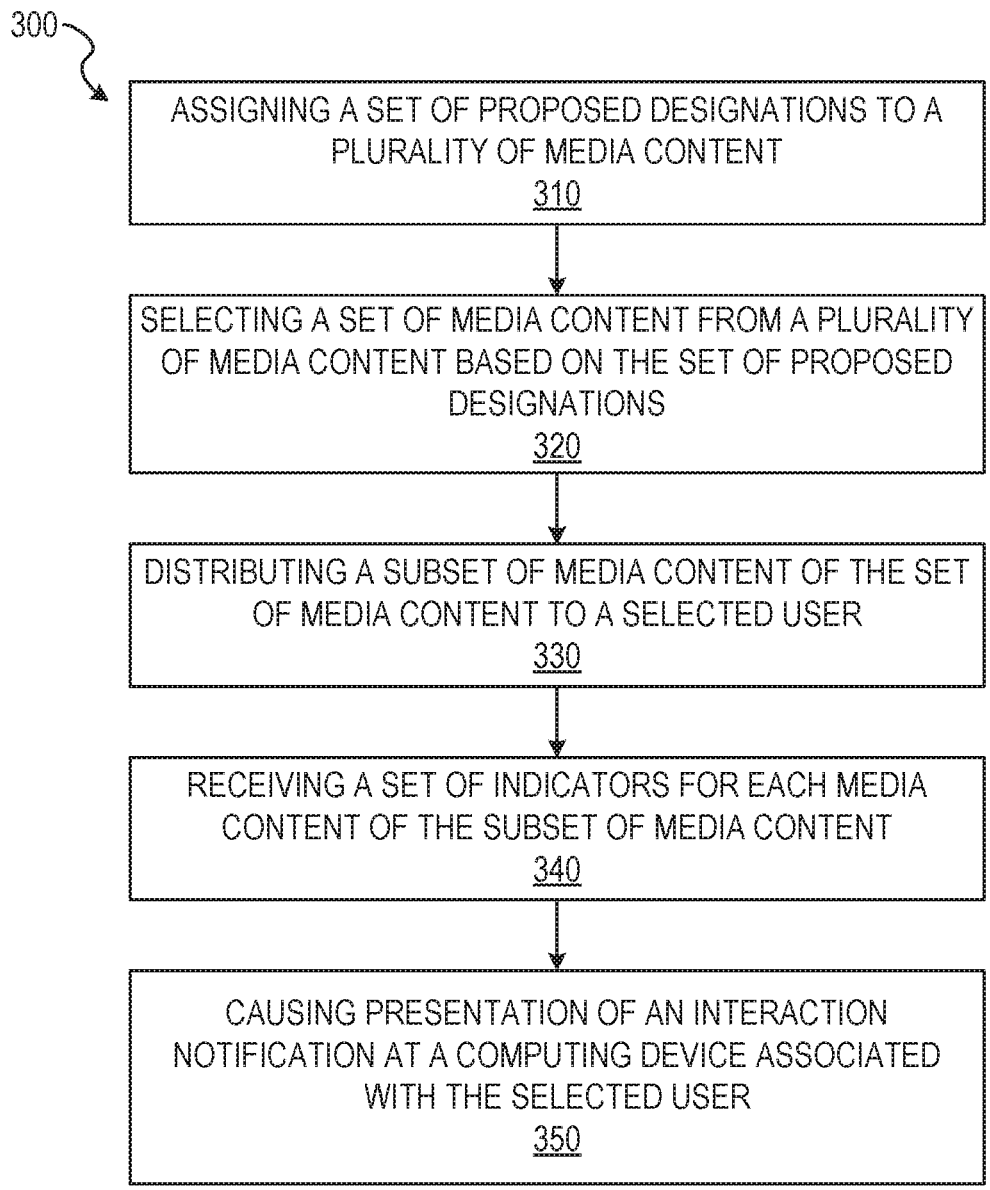
FIG. 3 is a flow diagram illustrating an example method for scaled delivery of media content, according to some example embodiments.

FIG. 3 depicts a flow diagram illustrating an example method 300 for scaled delivery of media content. The operations of method 300 may be performed by components of the content distribution system 160, and are so described below for purposes of illustration.

In operation 310, the assignment component 210 assigns a set of proposed designations to a plurality of media content. The plurality of media content may be a group of images, animations, video segments, audio segments, or other content which may be identified and categorized by users of the content distribution system 160. The plurality of media content may include differing types of media (images, video, and audio) from differing categories (e.g., scenery, people, events, locations, art, etc.) to which the assignment component 210 initially assigned proposed designations. In some embodiments, each media content instance (e.g., individual media items) of the plurality of media content is assigned to one or more proposed designations. The media items may comprise one or more of audio data, video data, image data, and message data (e.g., text, voice, or other messaging data). In some embodiments, the assignment component 210 assigns proposed designations to media content using one or more machine learning processes. The machine learning processes may incorporate machine learning-based image recognition, pattern recognition, object recognition, or any other suitable machine learned processes.

The assignment component 210 may receive media content instances from one or more users, retrieve media content instances from a database (e.g., an aggregated media content repository), or otherwise gain access to the plurality of media content. Upon accessing or otherwise obtaining access to the plurality of media content, the assignment component 210 may process the media content to identify one or more aspects, characteristics, content, subject, or other discernable information about the plurality of media content. Upon identifying the discernable information from the plurality of media content, the assignment component 210 may assign a proposed designation to each media content instance of the plurality of media content. In some embodiments, the proposed designations comprise a label, an identifying term, a category, or any other suitable descriptive information corresponding to the discernable information determined for each media content instance of the plurality of media content.

Once proposed designations have been assigned to the plurality of media content, the assignment component 210 may organize the plurality of media content. In some embodiments, the assignment component 210 organizes the plurality of media content according to the proposed designations of each media content instance of the plurality of media content. The assignment component 210 may organize the plurality of media content by proposed designation, such as grouping or associating each media content instance which share proposed designations. In some instances, the assignment component 210 groups, associates, or otherwise links media content instances of the plurality of media content which are associated with related proposed designations. Proposed designations may be related by location, geographical region, types, category designations (e.g., foods, hair care products, etc.), colors, or any other suitable relation.

In operation 320, the content component 220 selects a set of media content from a plurality of media content based on the set of proposed designations. Sets of media content may correspond to proposed designations, related proposed designations, categories of proposed designations, aspects of media content instances, characteristics of media content instances, or other suitable information. Sets of media content, selected by the content component 220, may be a subset of media content items, sharing a common proposed designation, selected from the plurality of media content. In some embodiments, the content component 220 selects the set of media content as a group of media content sharing a single proposed designation, category of proposed designation, similar proposed designations, or any other suitable related proposed designations. The set of media content may represent an entirety of the media content instances corresponding to or labeled with a specified proposed designation.

In some embodiments, the set of media content is selected upon assigning the set of proposed designations. For example, the content component 220 may select the set of media content in response to the assignment component 210 assigning the set of proposed designations. The selection of the set of media content may be automated to delineate the plurality of media content among differing proposed designations. The sets of media content may be divided logically, among differing data structures; physically, on differing computing devices or servers; by inclusion of metadata for the proposed designation within a file or data structure of the media content instances within the set of media content; or in any other suitable manner.

In some instances, selection of the set of media content is performed during task or interaction assignment. For example, the content component 220 may select the set of media content in response to selection or designation of a user to receive the set of media content. The content component 220 may select the set of media content by performing one or more selection or determination processes associated with the user and selecting media content instances, for inclusion in the set of media content, based on the selection or determination processes for the user.

In some embodiments, in addition to selection of the set of media content, the validation component 280 selects a user from the plurality of users. The user may be the selected user to whom portions of the set of media content (e.g., a subset of media content) are to be distributed. In some embodiments, the selected user may be identified or otherwise selected based on an aspect or characteristic of the user. The user aspects or characteristics may be associated with the user (e.g., demographic information for the user), a location (e.g., a current location, a home location, a geographic area, etc.), interaction history of the user (e.g., a usage amount of the social messaging system 130), a network of the user (e.g., a number or type of users associated with the selected user in the social messaging system 130), a usage threshold (e.g., usage of the social messaging system 130, a quality of messages of the user in the social messaging system 130, a number of interactions with messages of the user from members of a social network associated with the user on the social messaging system 130), or any other suitable aspect or characteristics. For example, a set of media content may be associated with a proposed designation of New York City, and the selected user may be chosen based on a current location or a home location of New York City. By way of another example, a set of media content may be associated with a proposed designation of a specific concert event, including a concert venue or location and a time. The selected user may be chosen based on a current location proximate to the concert venue at the specified time, an indication (e.g., a message from the user within the social messaging system 130) that the user is attending the concert event, or other similar basis.

In some instances, the selected user is determined based on one or more permissions associated with the user. The selected user may be approved for interactions corresponding to a specified group, set, or individual designations. For example, the user may be associated with animal designations (e.g., dogs, cats, and horses). The selected user, associated with animal designations, may be chosen when the proposed designation for the set of media content is a designation associated with an animal, identification of an animal, a value judgment based on an animal or a characteristic of an animal (e.g., cutest dogs), or any other suitable related designation.

In some embodiments, the user is provided, assigned, or otherwise associated with specified permissions based on interactions of the user on the social messaging system 130 or the content distribution system 160. Where the permissions are assigned to the user based on interactions with the content distribution system 160, the user may be provided with test interactions. The test interactions may be a set of structured interactions where designations assigned to media content instances are chosen by the content distribution system 160 and validated. The user may interact with the test interactions, selecting or confirming designations for the media content instances within the test interactions. Upon completion of the test interaction, the content distribution system 160 receives the designations selected by the user, determines a number of designations, chosen by the user, matching designations selected by the content distribution system 160 for the media content instances. Where the matching designations are greater than a predetermined threshold, the user may be assigned permission to receive sets of media content associated with proposed designations similar to those of the test interaction.

In some embodiments, test interactions may be subject to gamification. In such embodiments, test interactions may be formulated to provide benefits, rewards, or other positive feedback for guessing a correct caption or designation for a media content instance, identifying a highest rated designation (e.g., a most popular caption) for a media content instance, or identifying designations selected by members of the selected user's network. Gamification of the test interactions may enable training or other positive reinforcement to enhance a selected user's ability to engage in labeling, moderation, or other designation selection operations.

The selected user may be selected based on a content request. In some instances, the content request is generated based on selection of a user interface element for a structured interface, described below in more detail. Where the user is selected based on interaction with a user interface element for the structured interface, the set of media content may be selected prior to interaction with the user interface element. The user interface element may be generated as a representation of the structured interface corresponding to at least a portion of the set of media content. In such embodiments, upon selection of the set of media content, the interface component 270 generates the structured interface to contain at least a portion of the set of media content and the user interface element as a representation of one or more of the set of media content and the proposed designation corresponding to the set of media content.

In operation 330, the distribution component 230 distributes a subset of media content of the set of media content to a selected user of a plurality of users. The distribution component 230 may distribute the subset of media content of the set of media content to the selected user by transmitting the subset of media content to the selected user via the network 104. The subset of media content may be transmitted to the client device 110 of the selected user via the network 104 using any suitable transmission method. In some instances, the distribution component 230 transmits the subset of media content to an application associated with one or more of the social messaging system 130 and the content distribution system 160. In some embodiments, the subset of media content is presented at a computing device (e.g., the client device 110) associated with the selected user. The subset of media content may be presented within the application executed on the computing device.

In some embodiments, prior to distribution of the subset of media content, the content component 220 selects the subset of media content from the set of media content. The subset of media content may share a proposed designation. For example, where the set of media content is associated with a category of designations, the subset of media content may comprise media content instances within the set of media content which share the same proposed designation, selected from among the designations in the category. By way of further example, where the set of media content is associated with a set of related proposed designations (e.g., synonyms), the subset of media content may comprise media content instances which share a matching proposed designation.

In some embodiments, the proposed designations of the subset of media content correspond to the selected user. As described above, the selected user may be chosen based on permissions, user characteristics, user aspects, user network characteristics, user usage characteristics, or any other suitable definable element describing the user, and the definable element may be associated with a set or subset of proposed designations. For example, the definable elements or permissions may be associated with categories of designations, designations within a defined category, topics for which designations may be identified, locations related to designations, or any other suitable relation to selectable designations. For example, where the selected user is identified as being present at a specified location (e.g., a current location), the proposed designations available for selection by the content component 220, in choosing the subset of media content, may be within a geographic area surrounding the specified location. By way of another example, where the selected user has a permission associated with cats, the subset of media selected for presentation to the selected user may include proposed designations for "funny cats."

In some embodiments, where the selected user is associated with a location and a set of content types, the proposed designations of the subset of media content, distributed to the selected user, are associated with at least one of the location and the set of content types. The location for the user may be a current location, a home location (e.g., a static location, a home address, a school address, etc.), a geographic area, a favorite location (e.g., a location or area selected by the user, a repeated vacation location, etc.), or any other suitable current, historical, permanent, or temporary location. The content types may be categories or other organization identifications into which proposed designations may be arranged. In some instances, the types correspond to subject types, such as dogs, places, scene descriptions, venue identification, or any other suitable type. The types may also correspond to types of structured interactions into which proposed designations may be divided. For example, types relating to structured interactions may include social messaging moderation, story or theme moderation, places or locations, place ratings, labels, and other suitable types, classes, or categories of interactions relating to media content which may be displayed, played, or otherwise presented on the computing device (e.g., the client device 110). In some embodiments, moderation may be real-time or near real-time moderation, such that as media content is captured and provided to the content distribution system 160, the media content is distributed among designated users or a set of selected users for inclusion in a representative media stream for a concert, a news story, or other current or ongoing user capturable event.

Figure 4:
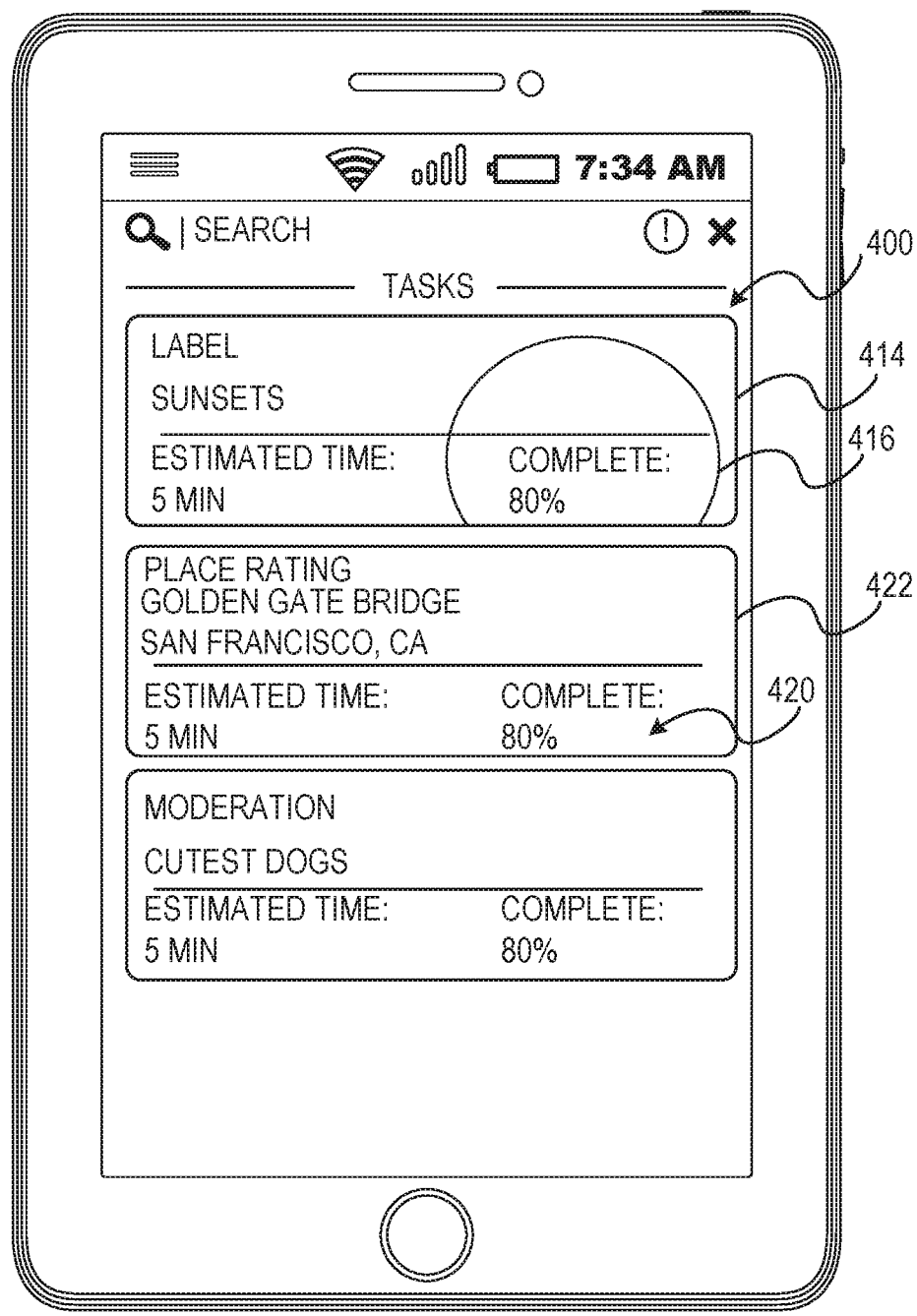
FIG. 4 is a user interface diagram depicting a structured interaction within a networked system, according to some example embodiments.
Figure 5:
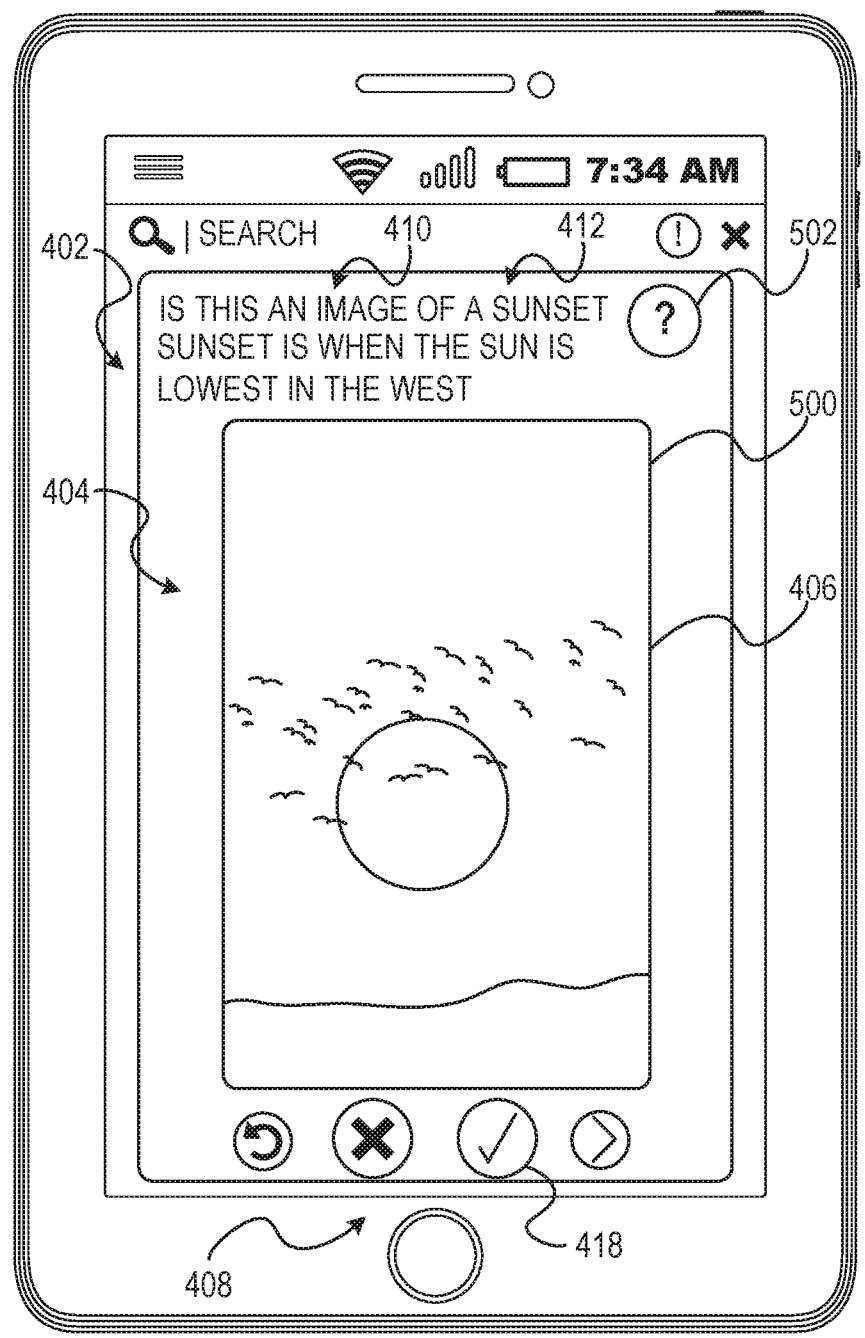
FIG. 5 is a user interface diagram depicting a structured interaction within a networked system, according to some example embodiments.

The subset of media content may be distributed to the selected user as a structured interaction. As shown in FIGS. 4-5, the structured interaction 402 comprises a plurality of structured media instances 404 and a representative interaction element 400. The content component 220 may create the structured interactions 402 by generating the plurality of structured media instances 404. Each structured media instance 404 may comprise a media content instance 406 of the subset of media content to be included within the structured interaction 402. Each structured media instance 404 may further comprise a set of user interface elements 408 and an indication 410 of the proposed designation 412 for the media content instance 406 of the individual structured media instance 404.

The content component 220 may generate the representative interaction element 400 to comprise a selectable user interface element 414. In some embodiments, the representative interaction element 400 includes a representation 416 of the proposed designation 412 corresponding to the subset of media content, a representation of the subset of media content, and one or more aspect indicators for the structured interaction 402. Interacting with the selectable user interface element 414, such as via tapping a touchscreen, causes one or more of the interface component 270 and the presentation component 250 to initiate the structured interaction 402 and cause presentation of at least one of the structured media instances 404 at the computing device of the selected user.

As shown in FIGS. 4-5, once the user interface element 414 is selected, a structured media instance 500 may be presented. The structured media instance 500 may be one of a set of structured media instances, where each structured media instance corresponds to a single media content instance of the subset of media content. Within the structured interaction 402, the selected user may be provided with a label screen which presents the selected user with an image (e.g., the media content instance 406 presented within the structured media instance 500). The indication 410 may include text asking if the image fits a description (e.g., the proposed designation 412). The set of user interface elements 408 may include a quarternary choice between acceptance (e.g., yes, the proposed designation 412 matches the image), rejection (e.g., no, the proposed designation 412 does not match the image), skip (e.g., a forward navigation), or back (e.g., a backward navigation). The acceptance interaction may accept the image as matching the proposed designation 412 and trigger presentation of a subsequent structured media instance. The rejection interaction may deny the image matches the proposed designation 412 and trigger presentation of a subsequent structured media instance. The skip interaction may trigger presentation of a subsequent structured media instance and leave the previously presented structured media instance 500 unmarked and available for later acceptance or rejection, or presentation to another selected user. The back interaction may return the selected user to a previously presented structured media instance. In some embodiments, the previously presented structured media instance is a structured media instance with which the selected user previously interacted to accept or reject the proposed designation.

In some embodiments, the structured media instances are presented using a swipe-style card interface. Each structured media instance may be presented as a graphical representation of a card or tile within a graphical user interface. A top header may include the indication 410 and the proposed designation 412. A selectable user interface element 502, such as a question mark button, may trigger presentation of a model interaction, a help menu, or other further explanation of selection criteria. The structured interaction may be formatted such that a swipe left is an acceptance interaction, a swipe right is a rejection interaction, a swipe up is a skip interaction, and a swipe down is a back interaction.

In operation 340, the access component 240 receives a set of indicators for each media content of the subset of media content. In some embodiments, each indicator represents an interaction with a media content of the subset of media content. The set of indicators may comprise an individual interaction for each media content instance of the subset of media content or each structured media instance 404. For example, as shown in FIGS. 4-5, selection of user interface element 4118 of the set of user interface elements 408 indicates a response to the structured media instance 500, such as acceptance of the proposed designation 412. The access component 240 may receive the set of indicators from one or more of the computing device, an application of the content distribution system 160 or the social messaging system 130, or components of the content distribution system 160 at least partially implemented at the computing device. In some embodiments, the set of indicators correspond to the subset of media content, such that the set of indicators contain a response or other interaction for each structured media instance 404 or media content instance of the subset of media content.

In operation 350, the presentation component 250 causes presentation of an interaction notification at the computing device (e.g., the client device 110) associated with the selected user. As shown in FIG. 4, in some embodiments, the interaction notification 420 indicates interaction with each media content of the subset of media content. The interaction notification 420 may be presented or included within the representative interaction element 400. In some embodiments, the interaction notification 420 indicates partial interactions with the structured interaction 402, such as a percentage of interactions completed. The interaction notification 420 may be dynamically generated or updated after or during each interaction session with the structured interaction 402. In some embodiments, upon completion of the structured interaction 402, the interaction notification 420 may indicate that the entire structured interaction 402 is complete, and the presentation component 250 may remove the representative interaction element 400 from presentation at the computing device of the user. In response to completion of the structured interaction 402, the presentation component 250 may cause presentation of one or more notifications associated with completion of the structured interaction 402 and cause the content distribution system 160 to issue a reward, compensation, a status change, or any other suitable incentive to the selected user or the computing device of the selected user.

Figure 6:
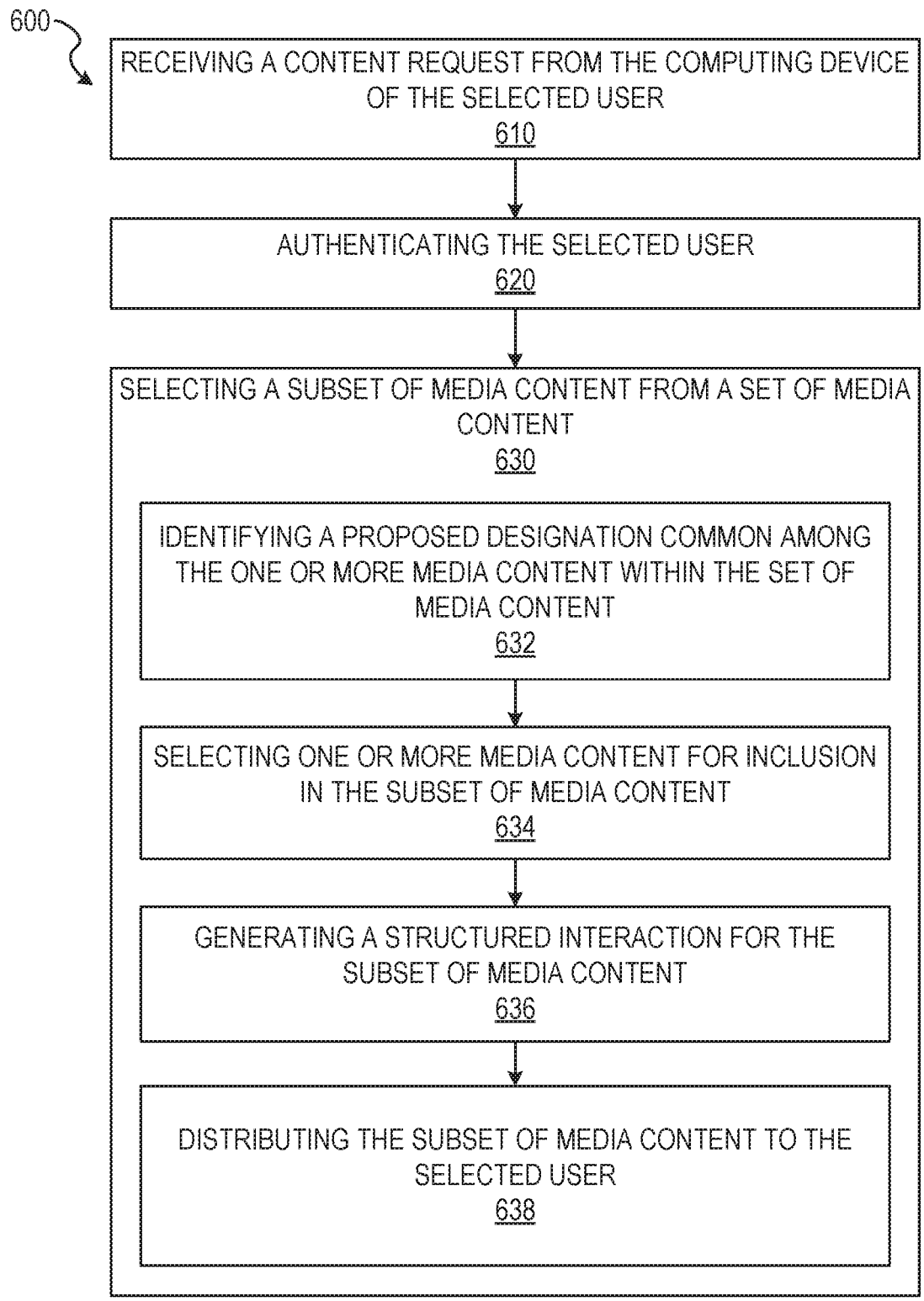
FIG. 6 is a flow diagram illustrating an example method for scaled delivery of media content, according to some example embodiments.

FIG. 6 depicts a flow diagram illustrating an example method 600 for scaled delivery of media content. The operations of method 600 may be performed by components of the content distribution system 160. In some instances, certain operations of the method 600 may be performed using one or more operations of the method 300 or as sub-operations of one or more operations of the method 300, as will be explained in more detail below.

In operation 610, the access component 240 receives a content request from the computing device of the selected user. In some embodiments, the access component 240 receives or otherwise accesses the content request from the computing device via a message, set of data packets, or other data transmission over the network 104. Once received, the access component 240 may transmit or otherwise pass the content request or a portion thereof to one or more components of the content distribution system 160, as described below in more detail.

In some embodiments, the content request is received in response to a content option presented within an application or other graphical user interface depicted on the computing device of the selected user. For example, the content distribution system 160 may transmit an indication, an offer, or an option indicating a structured interaction being available for the selected user. In some instances, the structured interaction is generated with a subset of media content and a proposed designation suitable for or associated with the selected user. The indication may also represent that an interaction time threshold (e.g., a time between a current time and a last completed structured interaction) is exceeded, and a new structured interaction may be generated for the selected user. The indication may represent a triggering event prompting generation or transmission of a structured interaction. For example, where a structured interaction relating to a location or an event (e.g., a specified action at a location and time) becomes available and the selected user enters into the location or geographic region near the location or the event, the content distribution system 160 may generate the structured interaction, determine the selected user is in a position associated with the structured interaction, and cause presentation of the indication as an available structured interaction for the selected user.

In operation 620, the authentication component 260 authenticates the selected user. The authentication component 260 may authenticate an identity of the selected user or authenticate the selected user with one or more of the content request, the subset of media content associated with a structured interaction, a proposed designation associated with a structured interaction, combinations thereof, or any other aspect of the interaction between the selected user and the content distribution system 160. Once the selected user is authenticated, the authentication component 260 may transmit one or more of the content request and an indication of a successful authentication may be transmitted to another component of the content distribution system 160, such as the content component 220.

Where the authentication component 260 authenticates the identity of the selected user, the authentication component 260 may match an identification of the selected user within the content request to an identification for a user associated or registered with the content distribution system 160. The identification within the content request and the identification of the user may be unique numerical identifiers, unique alphanumeric identifiers, an email address, a user name, or any other suitable identifier.

In embodiments where the authentication component 260 authenticates the selected user with the content request, the authentication component 260 may match an identification of the selected user within the content request with an identifier associated with a content option or other indication transmitted to a computing device. The content request may be transmitted in response to the content option or indication. In some embodiments, where the content request is responsive to the content option or indication, the content request contains an identifier of the selected user and an identifier for the content option or indication. Although described with respect to the authentication component 260 matching identifiers of the user within the content request and within the content option, the authentication component 260 may also match the content request, received from the computing device of the selected user, with the content option. The authentication component 260 may match a transmission record, representing transmission of the content option to the computing device, with an identifier of the content option within the content request and to which the content request is responding.

Where the authentication component 260 authenticates the selected user with the subset of media content associated with a structured interaction, the authentication component 260 may determine one or more aspect for the subset of media content. The authentication component 260 may then compare the one or more aspect with a permission for the selected user, a characteristic of the selected user, or any other suitable aspect or element associated with the selected user indicating authorization to engage or interact with a structured interaction for the subset of media content associated with the present structured interaction.

In some embodiments, the authentication component 260 authenticates the selected user with a proposed designation associated with a structured interaction. In such embodiments, the authentication component 260 may identify the proposed designation for the structured interaction from a data record comprising the structured interaction. The authentication component 260 then compares the proposed designation with one or more characteristic, permission, aspect, or other element associated with the selected user within the content distribution system 160. For example, the authentication component 260 may authenticate the selected user by matching the proposed designation of the structured interaction with one or more proposed designations associated with the selected user or one or more proposed designations for which a member profile of the selected user contains a corresponding permission.

In operation 630, the content component 220 selects the subset of media content from the set of media content. In some embodiments, the proposed designations of the subset of media content correspond to at least a portion of the content request. For example, where the content request responds to a content option unassociated with a proposed designation, the content component 220 may select the subset of media content based on a proposed designation associated with the selected user or for which the selected user has adequate permissions. In instances where the content request responds to a content option which includes a designation, the content component 220 may select the subset of media content by matching a proposed designation of the media content instances with the designation from the content option. The content component 220 may also select the subset of media content based on a designation within the content request. For example, where the content request includes an indication of a selected designation (e.g., a user selection of a designation from a set of designations presented within the content option), the content component 220 selects the subset of media content from the plurality of media content by identifying and selecting one or more media content instances associated with a proposed designation corresponding to the designation selected within the content request.

Figure 7:
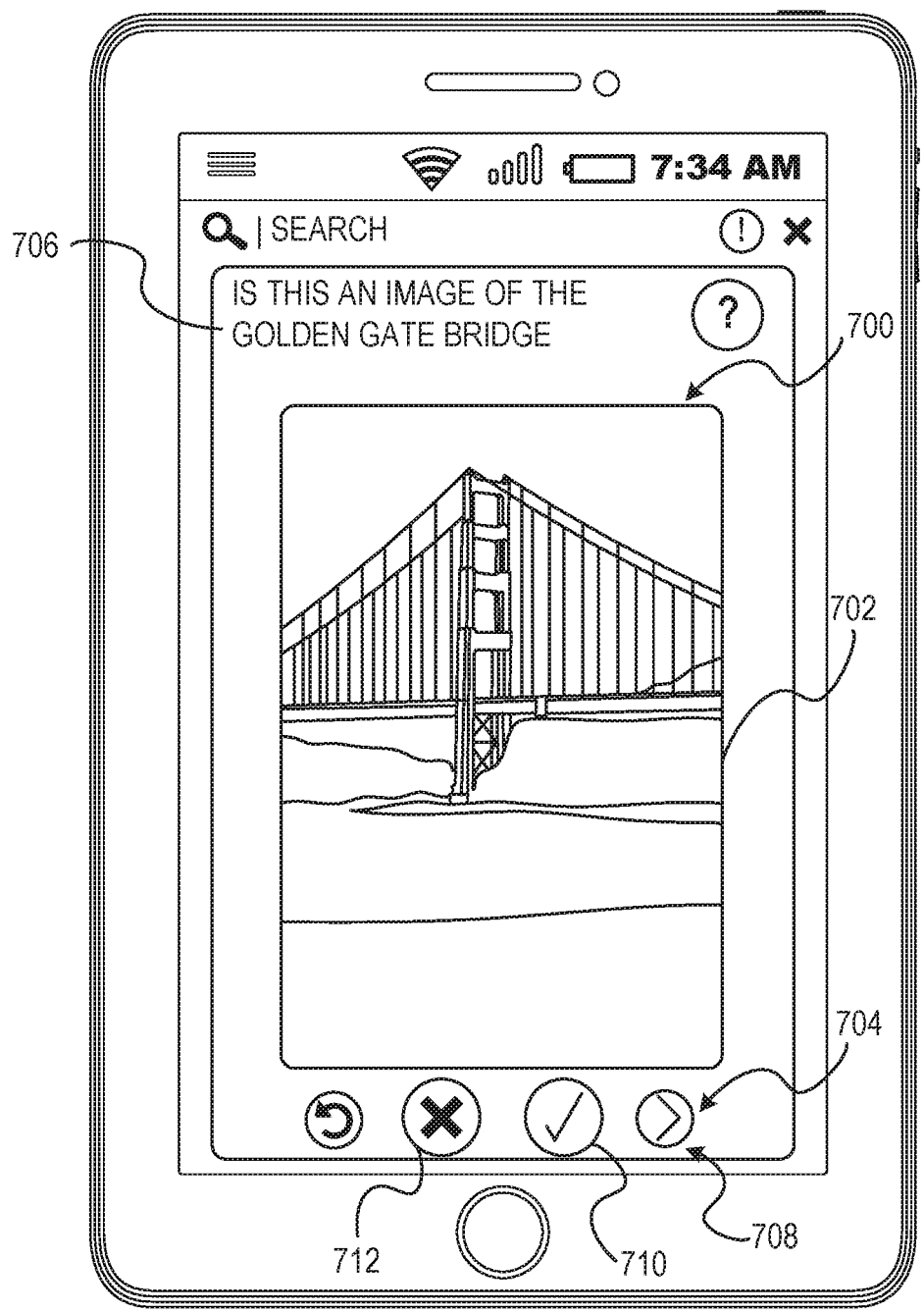
FIG. 7 is a user interface diagram depicting a structured interaction within a networked system, according to some example embodiments.

In some embodiments, the operation 630 comprises one or more sub-operations or is performed using a plurality of operations. In operation 632, the content component 220 identifies a proposed designation common among the one or more media content within the set of media content. The proposed designation corresponds to at least one of the location and the set of content types, as shown in FIGS. 4 and 7. As shown in FIG. 4, a representative interaction element 422 may be associated with a location. The representative interaction element 422 may be presented in response to the computing device of the selected user entering a location or coming within a specified proximity to the location of the representative interaction element 422. In response to the computing device coming within the specified proximity, the content component 220 may execute operation 632 to identify one or more media content of the set of media content associated with the proposed designation corresponding to the location. Similarly, the representative interaction may be generated and presented to the computing device based on the computing device moving within the specified proximity.

In operation 634, the content component 220 selects one or more media content for inclusion in the subset of media content. In some embodiments, the content component 220 selects the one or more media content based on a user history a history of structured interactions with media content instances similar to the one or more media content), an event associated with the location and the media content, a time associated with the location and the media content, a number of media content instances, or any other suitable selection metrics or characteristics. In some embodiments, the number of media content instances selected for inclusion in the subset of media content is defined or selected based on a completion time for a structured interaction or an interaction time for each media content instance. Where structured interactions are constrained to a predetermined time limit, the content component 220 may select a number of media content instances for inclusion within the subset of media content, such that a total interaction time for the structured interaction is at or below the predetermined time limit. For example, where each media content instance is associated with an interaction time of fifteen seconds and the structured interactions are constrained by a time limit of five minutes, the content component 220 may select a number of media content instances equal to or less than twenty media content instances.

In operation 636, the interface component 270 generates a structured interaction for the subset of media content. As shown in FIG. 7, a structured interaction may comprise a set of structured media instances 700. Each structured media instance 700 may include a media content instance 702, a set of user interface elements 704, and an indication of the proposed designation 706. The set of user interface elements 704 may include one or more navigation elements 708, an acceptance element 710, and a rejection element 712. The proposed designation 706 indication may comprise a presentation (e.g., text, audio, or graphical depiction) presenting the proposed designation at the computing device and within the structured media instance 700. The one or more navigation elements 708 may move or otherwise navigate among media content instances 702 or structured media instances 700 of the structured interaction.

Within the structured interaction, the selected user may be provided with a place ranking screen which presents the selected user with an image (e.g., a media content instance 702 presented within a structured media instance 700) from a location. The indication of the proposed designation 706 may include text asking if the image fits a place description (e.g., a portion of the proposed designation) and a location (e.g., a portion of the proposed designation). The selected user may interact with the set of user interface elements 704 to make a quarternary choice between acceptance (e.g., yes, the proposed designation is a fit), rejection (e.g., no, the proposed designation does not correspond to the image), skip (e.g., a forward navigation to a subsequent structured media instance), or back (e.g., a backward navigation to a previously presented structured media instance). The acceptance interaction may accept the image as matching the description and trigger presentation of the next image. The rejection interaction may deny the image as matching the description and trigger presentation of the next image. The skip interaction may trigger presentation of the next image in the series of the subset of media content. The skip interaction may also leave the previously presented structured media instance unmarked and available to be served to the selected user again or to another selected user. The back interaction may return the selected user to the previously approved or denied image, unmark the previously presented image as approved or denied, and allow the selected user to reclassify the image. In some embodiments, the back interaction enables presentation of a previously skipped media content instance. In some instances, the back interaction only returns a previously presented structured media instance immediately preceding a current structured media instance. In such instances, once acceptance or rejection is selected and two or more intervening structured media instances have been presented at the computing device, the selected user may be precluded from reclassifying the previously presented structured media instance.

In operation 638, the presentation component 250 distributes the subset of media content to the selected user by transmitting the structured interaction to the computing device associated with the selected user. In some embodiments, the structured interaction includes the subset of media content. In some embodiments, one or more of the presentation component 250 and the distribution component 230 perform operation 638 in a manner similar to or the same as described above with respect to operation 330.

Figure 8:
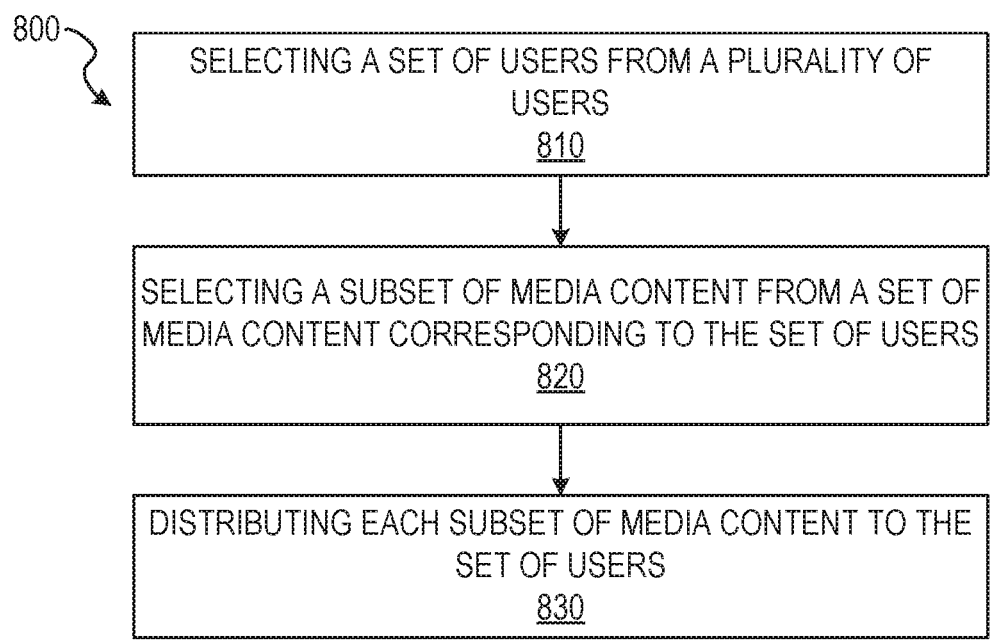
FIG. 8 is a flow diagram illustrating an example method for scaled delivery of media content, according to some example embodiments.

FIG. 8 depicts a flow diagram illustrating an example method 800 for scaled delivery of media content. The operations of method 800 may be performed by components of the content distribution system 160. In some instances, certain operations of the method 800 may be performed using one or more operations of the method 300 or the method 600 or as sub-operations of one or more operations of the method 300 or the method 600, as will be explained in more detail below.

In operation 810, the content component 220 selects a set of users from the plurality of users. In some embodiments, the set of users includes the selected user, described above with respect to method 300. Each user of the set of users may be selected in a manner similar to or the same as described above with respect to one or more of operations 320, 330, and 610. Each selected user of the set of users may be chosen based on one or more of a user characteristic, a network or content distribution system 160 usage parameter, a type of use performed by the user, one or more permissions, or any other suitable characteristic or distinguishing element for the respective user.

In operation 820, the content component 220 selects a subset of media content from a set of media content. Proposed designations of the subset of media may correspond to the user for which the subset of media content is selected. The content component 220 may select a single subset of media content for distribution among the selected set of users. In some embodiments, the content component 220 divides the set of media content into a plurality of subsets of media content. Each subset of media content may be distributed to a different user of the selected set of users. For example, the content component 220 may divide the set of media content based on a set of user interactions, such that each subset of media content corresponds to a user interaction (e.g., a structured interaction) having an estimated interaction duration within a predetermined time limit, as discussed above.

In operation 830, the presentation component 250 distributes each subset of media content to the user, of the set of users, for which the subset of media content is selected. The presentation component 250 or the distribution component 230 may distribute each subset of media content to a user in a manner similar to or the same as described above with respect to operations 330 and 638. Once distributed to the selected user, each subset of media content may be presented at a computing device associated with the selected user.

Figure 9:
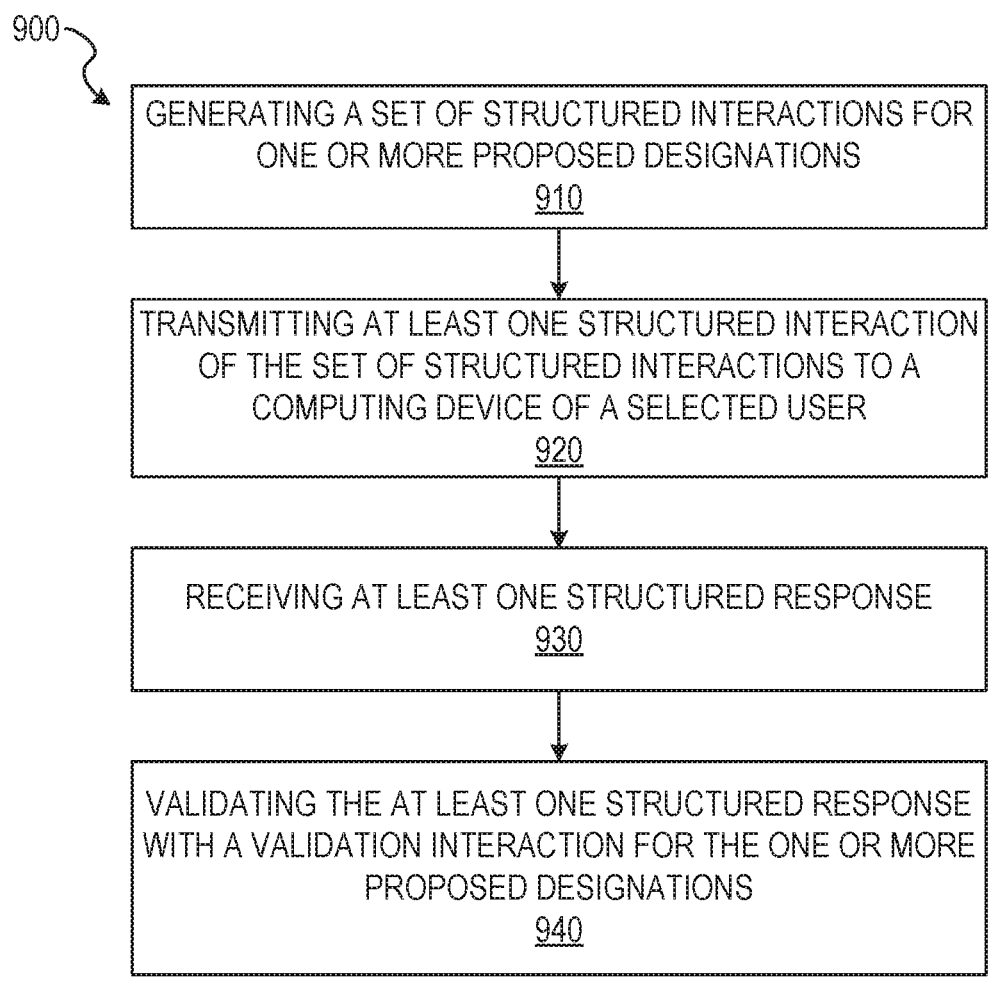
FIG. 9 is a flow diagram illustrating an example method for scaled delivery of media content, according to some example embodiments.

FIG. 9 depicts a flow diagram illustrating an example method 900 for scaled delivery of media content. The operations of method 900 may be performed by components of the content distribution system 160. In some instances, certain operations of the method 900 may be performed using one or more operations of the method 300 or the method 600 or as sub-operations of one or more operations of the method 300 or the method 600, as will be explained in more detail below.

Figure 10:
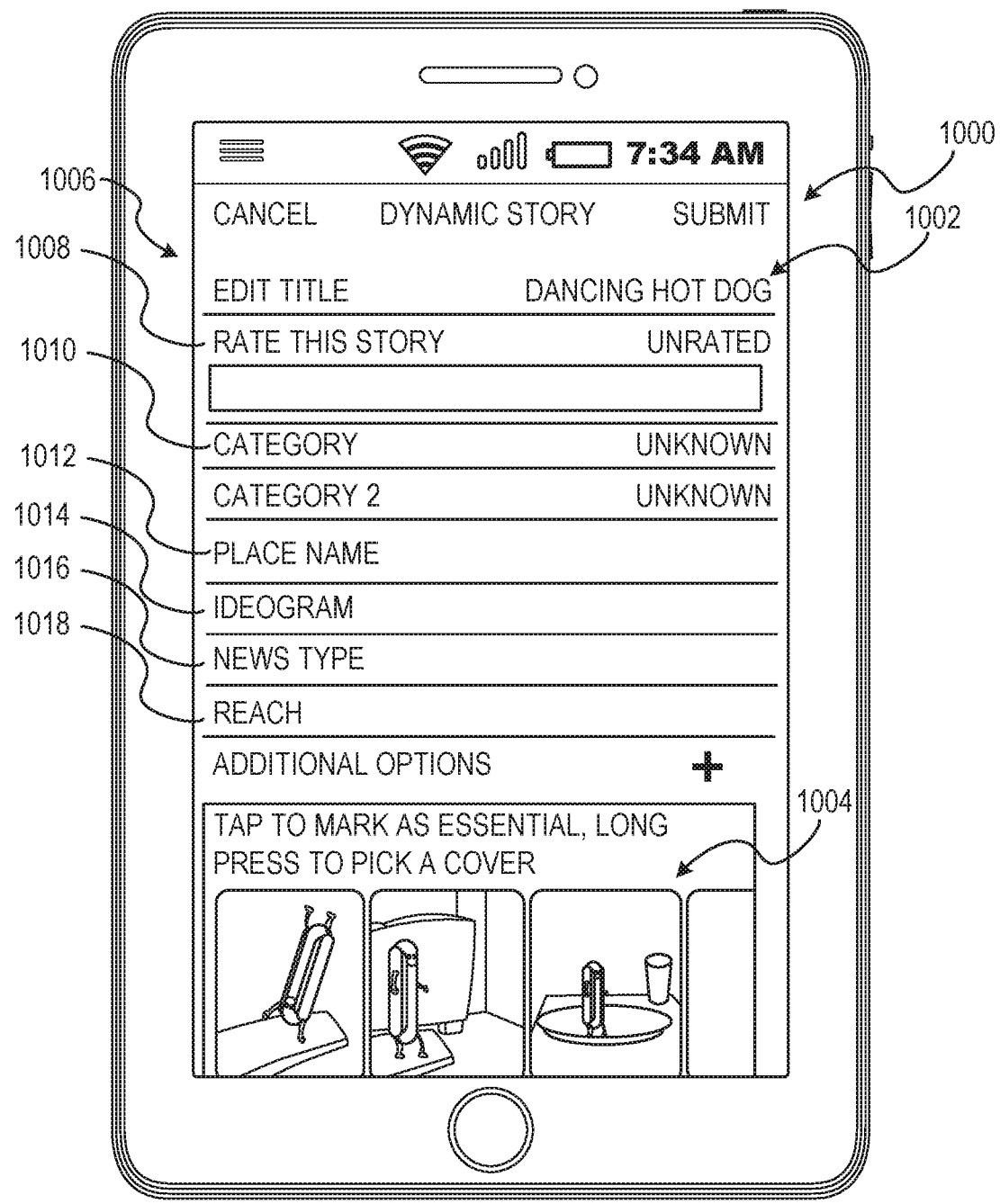
FIG. 10 is a user interface diagram depicting a structured interaction within a networked system, according to some example embodiments.

In operation 910, the interface component 270 generates a set of structured interactions for one or more proposed designations. Each structured interaction may correspond to a proposed designation. The structured interactions may be generated as described above with respect to operations 320 and 632-638. In some embodiments, as shown in FIG. 10, a single proposed designation 1002 may include a plurality of structured interactions 1004. The single proposed designation 1002 may be presented with a set of label elements 1006 for which the selected user may provide information, selections, or interactions to moderate media content presented within the plurality of structured interactions 1004. For example, the proposed designation 1002 and the set of structured interactions may be associated with moderation tasks or operations. The proposed designation 1002 may be identified for a subset of media content. The set of structured interactions may be generated to enable modification of a plurality of elements for the subset of media content, including proposed designations for the subset of media content.

As shown in FIG. 10, the selected user is presented with a moderation interface 1000 comprising the single proposed designation 1002, the plurality of structured interactions 1004, and the set of label elements 1006. In some embodiments, the moderation interface 1000 enables selection, manipulation, or organization of media content to be presented within an organized display or portrayal of a set of events. For each set of events, a plurality of media content may be captured or generated. For example, users may capture many images and videos of a concert event. Descriptive or user generated data may also be generated for the event, such as text descriptions, ideograms (e.g., emojis), metadata, and representative images. Moderation of the plurality of media content may include selection of a best or most representative content, labeling of content, label correction, or other suitable operations.

The moderation interface 1000 enables entry of information by the user to moderate presentation of the subset of media content associated with the plurality of structured interactions 1004. For example, the selected user may enter rating information in a first label element 1008. The rating information may include no rating, poor ratings (e.g., awful or bad), intermediate ratings (e.g., ok, average, or alright), and positive ratings (e.g., good or "love it"). A second label element 1010 may enable entry of category information such as awards ceremony, barbeque, campus, cinema, comedy, concert, convention, disaster, fair, exhibit, fashion, fireworks, fitness, food, games, lecture, holiday, makeup, location, march, music festival, nightlife, none, other performance, party, parade, political event, press, public relations, protest, rodeo, sightseeing attraction, street performance, theater, or other suitable labels. A third label element 1012 may enable entry of a place name. A fourth label element 1014 may enable entry of an ideogram, such as an emoji. A fifth label element 1016 enables entry of a news type (e.g., a breaking story, "happening now," or opinion story). A sixth label element 1018 enables entry of a reach or region label, such as "local," a city, a state, a country, or a global designation. Although described with specific label elements, it should be understood that additional label elements or options may be provided. For example, combination elements, offense level, compliance with content guidelines, periodic nature of an event, and other suitable information may be provided. In some embodiments, the plurality of structured interactions 1004 may be selectable or draggable to reorder or otherwise modify presentation or presentation order of the individual structured interactions. Further, interaction with the cards (e.g., individual structured interactions) may toggle through selections relating to priority, necessity, usefulness, quality of representation, or other suitable qualitative ratings or designations.

In operation 920, the presentation component 250 transmits at least one structured interaction of the set of structured interactions to the computing device associated with the selected user. In some embodiments, the presentation component 250 and the distribution component 230 transmit or otherwise distribute the at least one structured interaction to the computing device in a manner similar to or the same as described above with respect to operations 330 and 638.

In operation 930, the access component 240 receives at least one structured response indicating interaction with one or more elements of the at least one structured interactions. The structured response may be generated at the computing device of the selected user. The structured response may be generated based on or in response to the computing device receiving or detecting user interactions with selectable user interface elements presented within a graphical user interface depicted on a display component associated with the computing device. In some embodiments, the access component 240 receives the at least one structured response in a manner similar to or the same as described above with respect to operations 340 and 350.

In operation 940, the validation component 280 validates the at least one structured response with a validated interaction for the one or more proposed designations. The validation component 280 may validate the at least one structured response by comparing an acceptance or rejection of the proposed designation for each media content instance presented within the structured interface to a first selected user to acceptance or rejections from a second selected user or plurality of selected users. The validation component 280 may then validate the acceptance or rejection of designations based on a consensus of the plurality of selected users. In some instances, the validation component 280 validates the at least one structured response by comparing machine-learned analysis performed on the media content instances, comparing proposed designations for similar media content instances with the accepted or rejected proposed designations of the subset of media content within the structured response, and determining whether differences among the similar media content instances warrant changes in designations between the similar media content instances and the subset of media content within the structured response.

Previous systems and methods for distributing and delivering content or performing labeling and verification operations of machine learning methods may scale poorly as greater numbers or amounts of content are to be delivered to users. Similarly, as greater numbers of media content are analyzed by machine learning operations, verifying classification, labeling, or content recognition results of machine learning operations increase in difficulty. Embodiments of the content distribution system 160 address these technical difficulties by providing mechanisms for distribution and delivery of media content to users which scales according to one or more of the amount of media content to be delivered or distributed and the amount of users requesting content or to whom content is to be distributed. Further embodiments of the content distribution system 160 address technical difficulties in verifying classification, labeling, or content recognition results of machine learning operations (e.g., assigning proposed designations to media content) by employing methodologies for ordered distribution of media content and associated proposed designations for validation by users of the content distribution system 160 or the social messaging system 130. Further, embodiments of the content distribution system 160 enable curation, moderation, search labeling, and other tasks or operations to be distributed among users. Such embodiments enable scaled creation of machine learning training databases through application of proposed designations to media content instances.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example; at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments; the processors or processor-implemented components are located in a single geographic location (e.g., within a home environment, an office environment, or a server farm). In other example embodiments, the processors or processor-implemented components are distributed across a number of geographic locations.

Applications

Figure 11:
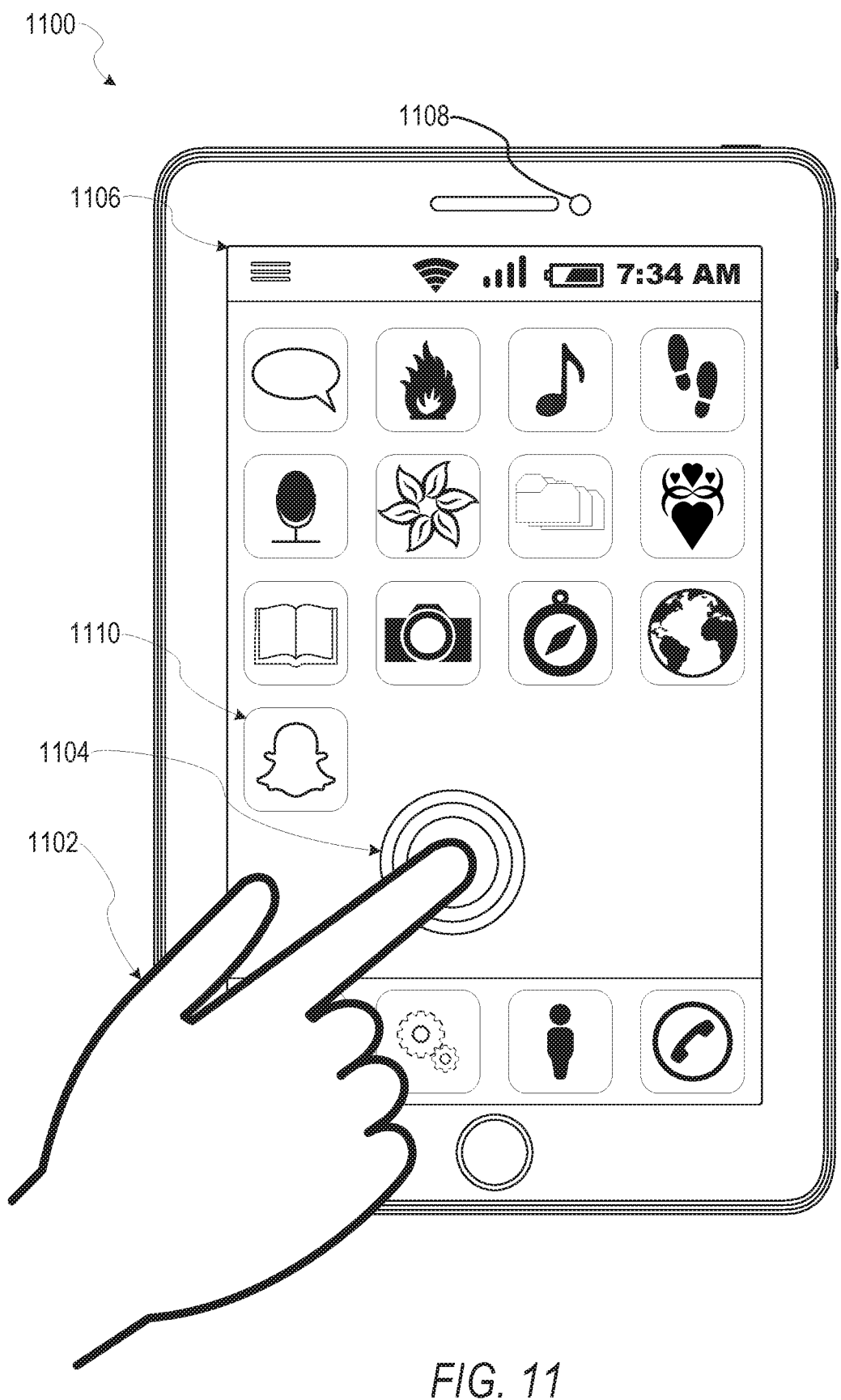
FIG. 11 is a user interface diagram depicting an example mobile device and mobile operating system interface, according to some example embodiments.

FIG. 11 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 11, includes an imaging device 1108. The imaging device 1108 may be a camera or any other device coupled to the mobile device 1100 capable of capturing a video stream or one or more successive images. The imaging device 1108 may be triggered by the content distribution system 160 or a selectable user interface element to initiate capture of a video stream or succession of images and pass the video stream or succession of images to the content distribution system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110 that, consistent with some embodiments, allows users to exchange ephemeral messages that include media content. In this example, the social messaging app 1110 can incorporate aspects of embodiments described herein. For example, in some embodiments the social messaging app 1110 includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

Figure 12:
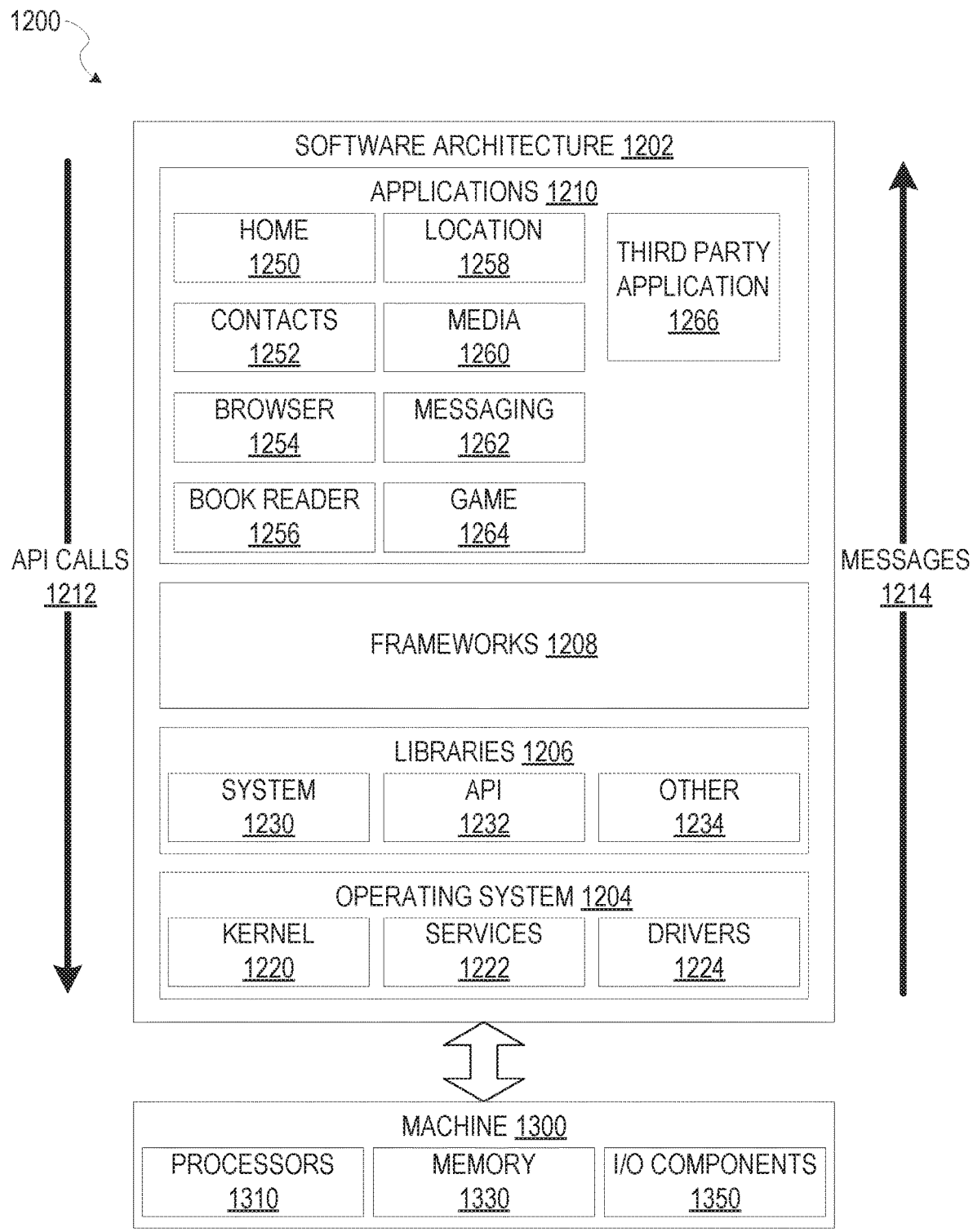
FIG. 12 is a block diagram illustrating an example of a software architecture that may be installed on a machine, according to some example embodiments.

In some embodiments, an ephemeral message system may include messages having ephemeral video clips or images which are deleted following a deletion trigger event such as a viewing time or viewing completion. In such embodiments, a device implementing the content distribution system 160 may enable scaled delivery of media content within ephemeral messages, and transmit the ephemeral messages to a server or another device using the ephemeral message system Software Architecture FIG. 12 is a block diagram 1200 illustrating an architecture of software 1202, which can be installed on the devices described above. FIG. 12 is merely a non-limiting example of a software architecture, and it will be appreciated that many other architectures can be implemented to facilitate the functionality described herein. In various embodiments, the software 1202 is implemented by hardware such as machine a 1300 of FIG. 13 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating systems. In this example, the third-party application 1266 can invoke the API calls 1212 provided by the operating system 1204 to facilitate functionality described herein.

Example Machine Architecture and Machine-Readable Medium

Figure 13:
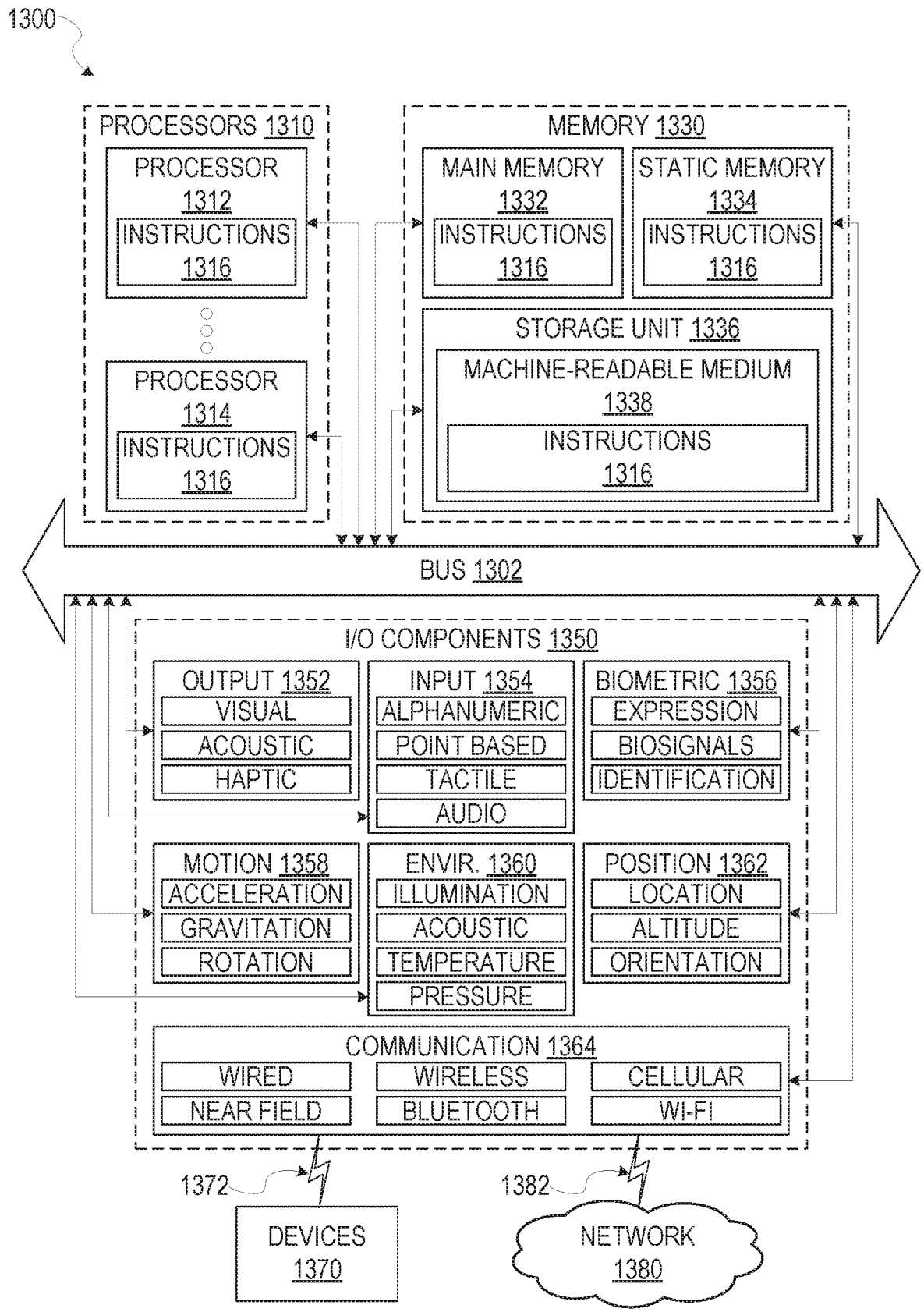
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of a machine 1300, according to some embodiments, able to read instructions (e.g., processor executable instructions) from a machine-readable medium (e.g., a non-transitory machine-readable storage medium) and perform any of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) include, for example, a processor 1312 and a processor 1314 that may execute the instructions 1316. The term "processor" is intended to include multi-core processors that may comprise two or more independent processors (also referred to as "cores") that can execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
assigning, by one or more processors using a machine learning process, a set of proposed designations to a plurality of media content, each media content instance of the plurality of media content being assigned one or more proposed designations describing media content of the respective media content instance;

organizing the plurality of media content into related proposed designations using the one or more proposed designations of each media content instance;

selecting, a set of media content from the plurality of media content based on the related proposed designations, the set of media content being a subset of the plurality of media content;

distributing, the subset of media content of the set of media content to a computing device associated with a selected user of a plurality of users;

receiving a set of indicators for each media content of the subset of media content; each indicator representing an interaction with a media content of the subset of media content; and causing presentation of an interaction notification at the computing device associated with the selected user, the interaction notification indicating interaction with each media content of the subset of media content.

2. The method of claim 1 further comprising:
receiving a content request from the computing device of the selected user;
authenticating the selected user; and
selecting the subset of media content from the set of media content, proposed designations of the subset of media content corresponding to at least a portion of the content request.

3. The method of claim 2, wherein the content request includes a location and a set of content types, and wherein selecting the subset of media content further comprises:
identifying a proposed designation common among one or more media content within the set of media content, the proposed designation corresponding to at least one of the location and the set of content types;
selecting the one or more media content for inclusion in the subset of media content;
generating a structured interaction for the subset of media content; and
distributing the subset of media content to the selected user by transmitting the structured interaction, with the subset of media content, to the computing device associated with the selected user.

4. The method of claim 3, wherein generating the structured interaction further comprises:
generating a plurality of structured media instances, each structured media instance comprising a media content of the subset of media content included within the structured interaction, a set of user interface elements, and an indication of the proposed designation for the media content; and
generating a representative interaction element comprising a selectable user interface element, the proposed designation corresponding to the subset of media content, and one or more aspect indicators for the structured interaction.

5. The method of claim 1 further comprising:
selecting a user from the plurality of users, the user being the selected user; and
selecting the subset of media content from the set of media content, proposed designations of the subset of media content corresponding to the selected user.

6. The method of claim 5, wherein the selected user is a first selected user and selecting the user from the plurality of users further comprises:
selecting a set of users from the plurality of users, the set of users including the first selected user;
for each user of the set of users, selecting a subset of media content from the set of media content, the proposed designations of the subset of media content corresponding to the user for which the subset of media content is selected; and
distributing each subset of media content to the user, of the set of users, for which the subset of media content is selected.

7. The method of claim 5, wherein the selected user is associated with a location and a set of content types, the proposed designations of subset of media content, distributed to the selected user, being associated with at least one of the location and the set of content types.

8. The method of claim 1 further comprising:
generating a set of structured interactions for one or more proposed designations, each structured interaction corresponding to a proposed designation;
transmitting at least one structured interaction of the set of structured interactions to the computing device associated with the selected user;
receiving at least one structured response indicating interaction with one or more elements of the at least one structured interactions; and
validating the at least one structured response with a validated interaction for the one or more proposed designations.

9. A system comprising:
one or more processors; and
a anon-transitory processor-readable storage medium storing processor executable instructions that, when executed by the one or more processors, cause the one or more processors to perform operations comprising:
assigning, by one or more processors using a machine learning process, a set of proposed designations to a plurality of media content, each media content instance of the plurality of media content being assigned one or more proposed designations describing media content of the respective media content instance;
organizing the plurality of media content into related proposed designations using the one or more proposed designations of each media content instance;
selecting a set of media content from the plurality of media content based on the related proposed designations, the set of media content being a subset of the plurality of media content;
distributing the subset of media content of the set of media content to a computing device associated with a selected user of a plurality of users;
receiving a set of indicators for each media content of the subset of media content, each indicator representing an interaction with a media content of the subset of media content; and
causing presentation of an interaction notification at the computing device associated with the selected user, the interaction notification indicating interaction with each media content of the subset of media content.

10. The system of claim 9, wherein the operations further comprise:
receiving a content request from the computing device of the selected user;
authenticating the selected user; and
selecting the subset of media content from the set of media content, proposed designations of the subset of media content corresponding to at least a portion of the content request.

11. The system of claim 10, wherein the content request includes a location and a set of content types, and wherein selecting the subset of media content further comprises:

identifying a proposed designation common among one or more media content within the set of media content, the proposed designation corresponding to at least one of the location and the set of content types;
selecting the one or more media content for inclusion in the subset of media content;
generating a structured interaction for the subset of media content; and
distributing the subset of media content to the selected user by transmitting the structured interaction, with the subset of media content, to the computing device associated with the selected user.

12. The system of claim 11, wherein generating the structured interaction further comprises:
generating a plurality of structured media instances, each structured media instance comprising a media content of the subset of media content included within the structured interaction, a set of user interface elements, and an indication of the proposed designation for the media content; and
generating a representative interaction element comprising a selectable user interface element, the proposed designation corresponding to the subset of media content, and one or more aspect indicators for the structured interaction.

13. The system of claim 9, wherein the operations further comprise:
selecting a user from the plurality of users, the user being the selected user; and
selecting the subset of media content from the set of media content, proposed designations of the subset of media content corresponding to the selected user.

14. The system of claim 13, wherein the selected user is a first selected user and selecting the user from the plurality of users further comprises:
selecting a set of users from the plurality of users, the set of users including the first selected user;
for each user of the set of users, selecting a subset of media content from the set of media content, the proposed designations of the subset of media content corresponding to the user for which the subset of media content is selected; and
distributing each subset of media content to the user, of the set of users, for which the subset of media content is selected.

15. The system of claim 9, wherein the operations further comprise:
generating a set of structured interactions for one or more proposed designations, each structured interaction corresponding to a proposed designation;
transmitting at least one structured interaction of the set of structured interactions to the computing device associated with the selected user;
receiving at least one structured response indicating interaction with one or more elements of the at least one structured interactions; and
validating the at least one structured response with a validated interaction for the one or more proposed designations.

16. A non-transitory processor-readable storage medium storing processor-executable instructions that, when executed by one or more processors of a machine, cause the machine to perform operations comprising:
assigning, by one or more processors using a machine learning process, a set of proposed designations to a plurality of media content, each media content instance of the plurality of media content being assigned one or more proposed designations describing media content of the respective media content instance;
organizing the plurality of media content into related proposed designations using the one or more proposed designations of each media content instance;
selecting a set of media content from the plurality of media content based on the related proposed designations, the set of media content being a subset of the plurality of media content;
distributing the subset of media content of the set of media content to a computing device associated with a selected user of a plurality of users;
receiving a set of indicators for each media content of the subset of media content, each indicator representing an interaction with a media content of the subset of media content; and
causing presentation of an interaction notification at the computing device associated with the selected user, the interaction notification indicating interaction with each media content of the subset of media content.

17. The non-transitory processor-readable storage medium of claim 16, further comprising:
receiving a content request from the computing device of the selected user;
authenticating the selected user; and
selecting the subset of media content from the set of media content, proposed designations of the subset of media content corresponding to at least a portion of the content request.

18. The non-transitory processor-readable storage medium of claim 17, wherein the content request includes a location and a set of content types, and wherein selecting the subset of media content further comprises:
identifying a proposed designation common among one or more media content within the set of media content, the proposed designation corresponding to at least one of the location and the set of content types;
selecting the one or more media content for inclusion in the subset of media content;
generating a structured interaction for the subset of media content; and
distributing the subset of media content to the selected user by transmitting the structured interaction, with the subset of media content, to the computing device associated with the selected user.

19. The non-transitory processor-readable storage medium of claim 16, further comprising:
selecting a set of users from the plurality of users;
for each user of the set of users, selecting a subset of media content from the set of media content, proposed designations of the subset of media content corresponding to the user for which the subset of media content is selected; and
distributing each subset of media content to the user, of the set of users, for which the subset of media content is selected.

20. The non-transitory processor-readable storage medium of claim 16, wherein the operations further comprise:
generating a set of structured interactions for one or more proposed designations, each structured interaction corresponding to a proposed designation;
transmitting at least one structured interaction of the set of structured interactions to the computing device associated with the selected user;

receiving at least one structured response indicating interaction with one or more elements of the at least one structured interactions; and validating the at least one structured response with a validated interaction for the one or more proposed designations.

\* \* \* \* \*

UNITED STATES PATENT AND TRADEMARK OFFICE
CERTIFICATE OF CORRECTION

| | |
|---|---|
| PATENT NO. | : 11,429,656 B2 |
| APPLICATION NO. | : 16/921624 |
| DATED | : August 30, 2022 |
| INVENTOR(S) | : Cook et al. |

It is certified that error appears in the above-identified patent and that said Letters Patent is hereby corrected as shown below:

In the Claims

In Column 27, Line 12, in Claim 1, delete "content;" and insert --content,-- therefor In Column 28, Line 28, in Claim 9, delete "anon-transitory" and insert --non-transitory-- therefor Signed and Sealed this
Thirteenth Day of June, 2023

*Katherine Kelly Vidal*

Katherine Kelly Vidal
*Director of the United States Patent and Trademark Office*